Oct. 10, 1944.   R. L. SKINNER ET AL   2,360,020
FILTER
Filed July 22, 1942   2 Sheets-Sheet 2

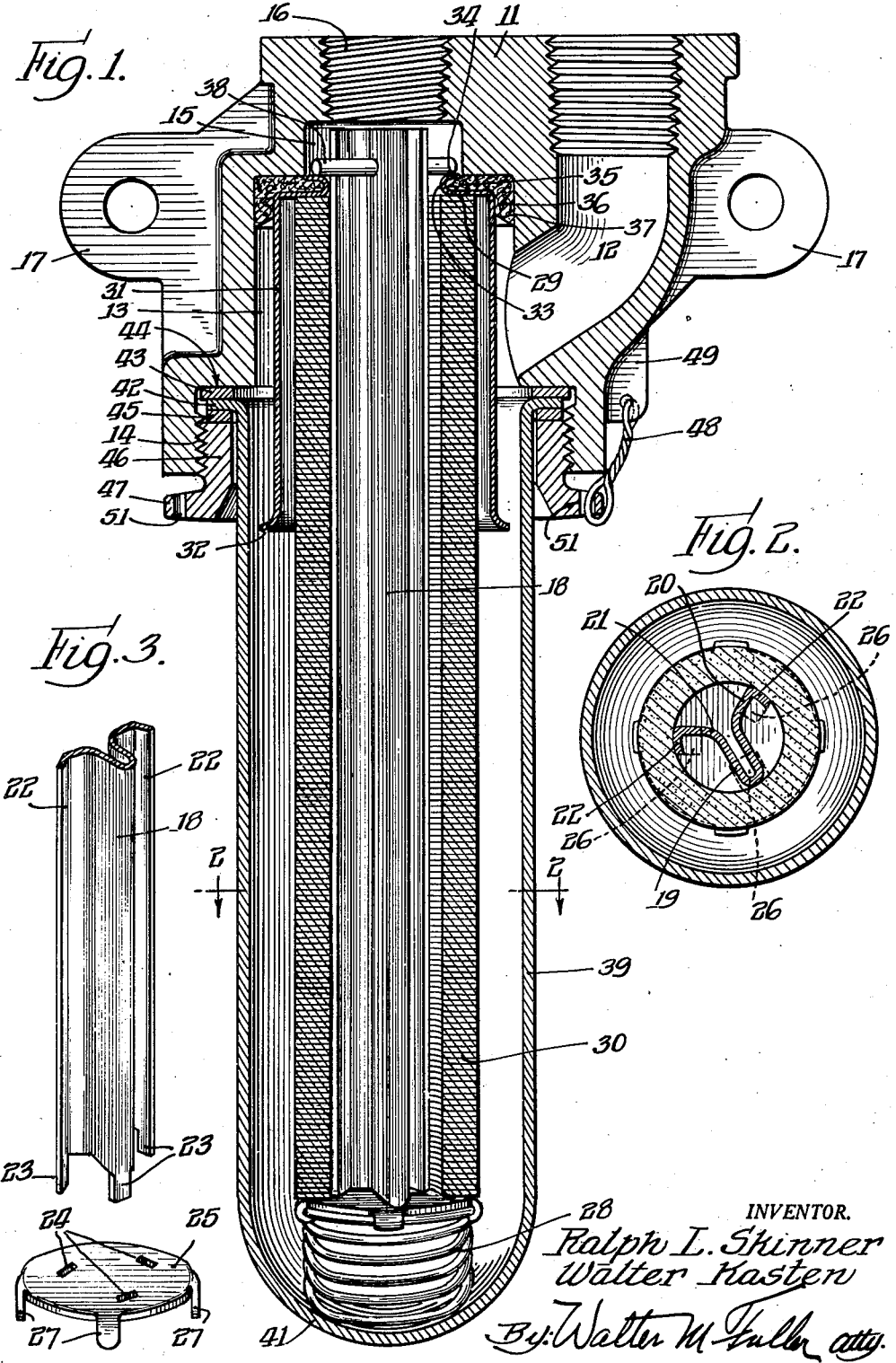
Oct. 10, 1944.    R. L. SKINNER ET AL    2,360,020
FILTER
Filed July 22, 1942    2 Sheets-Sheet 1
INVENTOR.
Ralph L. Skinner
Walter Kasten
By: Walter M Fuller atty.

INVENTORS.
Ralph L. Skinner
Walter Kasten
By:- Walter M. Fuller
atty.

Patented Oct. 10, 1944

2,360,020

UNITED STATES PATENT OFFICE 2,360,020

FILTER

Ralph L. Skinner, Birmingham, and Walter Kasten, Franklin, Mich.; said Kasten assignor to said Skinner Application July 22, 1942, Serial No. 451,936

2 Claims. (Cl. 210—183)

The current invention concerns certain novel structural features in filters and more particularly in filters of the edge-type, wherein the filtering action occurs between, rather than through, the discs of the filter-pack.

One aim of the invention is to provide a construction from which the filter-pack may be easily and readily removed for cleaning or replacement purposes and which is adequately sealed against pressures when in proper operative place in the filter.

A further object of the invention is to supply an efficient filter which is relatively cheap to construct and which yet possesses outstanding efficiency in operation.

An added purpose of the invention is to provide a filter which is not subject to damage or injury during ordinary service and when it is being dismantled or its parts reassembled.

To enable those acquainted with this art to understand the advantages of this invention fully from structural and functional standpoints, a present, preferred embodiment of the invention has been illustrated in detail in the accompanying drawings and for simplicity, like reference numerals have been employed to designate the same parts throughout the several views.

In these drawings:

Figure 1 is a longitudinal, vertical section through the center of the filter with its lower portion partly or slightly in perspective.

Figure 2 is a horizontal cross-section on line 2—2 of Figure 1, the parts being viewed downwardly;

Figure 3 shows in separated relation and partly in perspective, the normally associated members at the bottom of the filter-pack.

Figure 4:
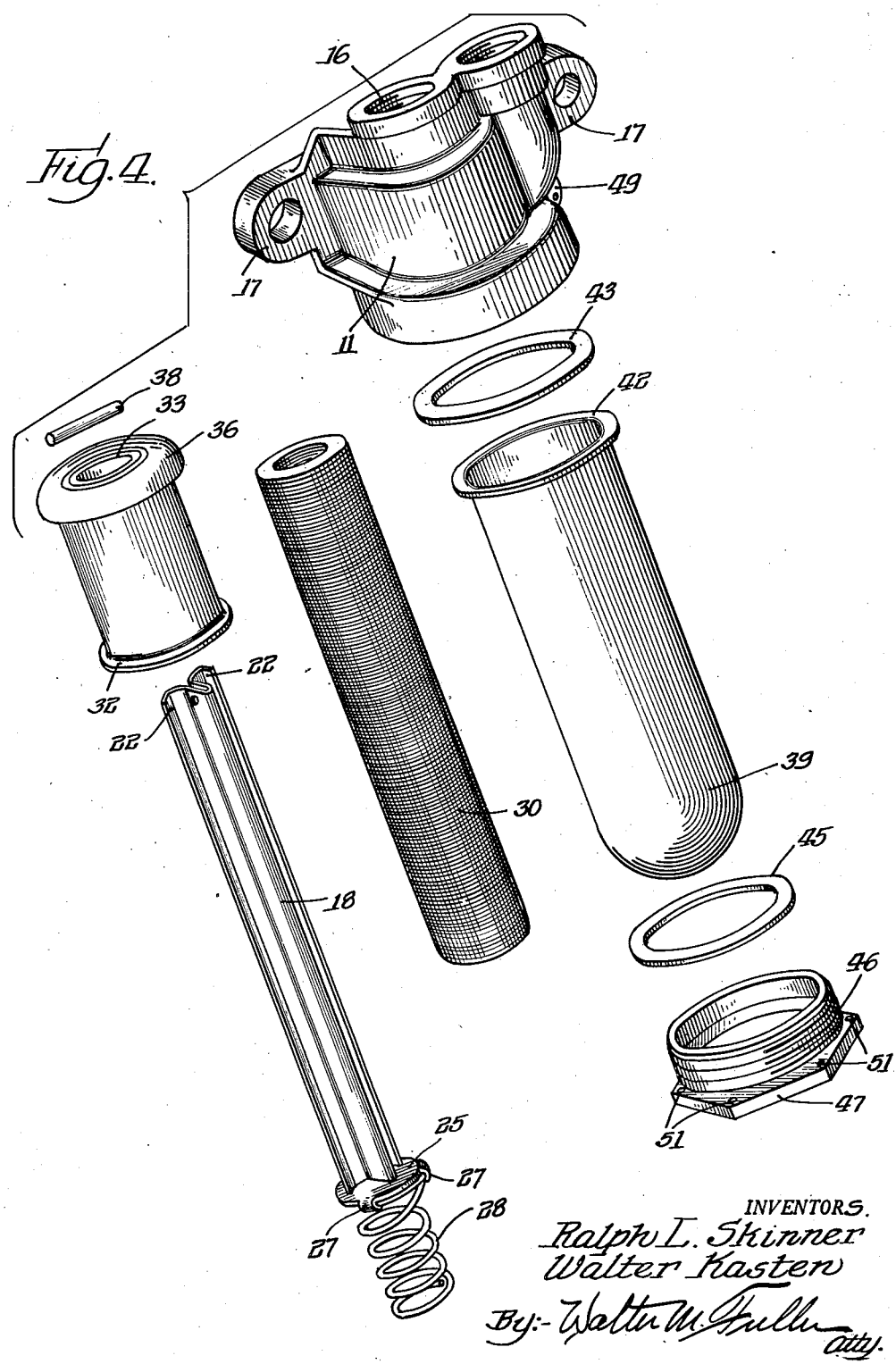
Figure 4 presents all of the parts of the structure in perspective and in non-assembled relation.

Referring to these drawings, it will be observed that the new and improved filter includes a main, hollow, supporting body, casting, or head 11 provided with a screw-threaded inlet-passage 12 communicating with the side of the main, cylindrical chamber 13, the latter having a downwardly-open, larger, internally-screw-threaded mouth 14, chamber 13 also having a reduced-diameter, cylindrical, centrally-located, upward-extension 15 connected to the screw-threaded outlet or discharge passage 16, casting 11 being fitted with a pair of apertured, oppositely-outstanding lugs or ears 17, 17 by means of which and bolts or screws (not shown) the filter may be fastened to a suitable support.

The filter-pack, which performs the filtering operation, includes a central, longitudinally-bent, sheet-metal rod 18 having three more or less radially-disposed ribs or arms, of which one 19 is of double-thickness of metal, whereas the other two 20, 21 are of single-thickness with laterally-bent sections 22, 22, the lower end of such rod having three downwardly-directed ears 23, 23, 23, extended through holes 24, 24, 24 in an end metal-disc or terminal member 25 and bent over below the disc at 26, 26, 26 to hold the disc attached or affixed permanently to the rod, such disc 25 having in addition marginal ears 27, 27, 27 bent around the top ring or convolution of a spiral-spring 28 thus fixedly securing the spring to the underside of the disc.

An edge-filtration stack or pack 30 of washer-shaped paper, uneven-surface or other comparable discs suitably charged or impregnated with an agent, which prevents the liquid or gas to be filtered or any of its contaminants or diluents from deleteriously or injuriously affecting the material of the bodies of the discs, are mounted face-to-face on, and maintained in superposed register with, one another by the rod 18, the diameter of which is practically the same as the internal caliber of the central-passage of the filter-pack 30 formed by the aligned or registered apertures of the numerous discs, the bottom disc bearing on the upper surface of the terminal metal disc 25.

As is clearly presented in the drawings, the top, end, paper-disc of the pack 30 bears against the under or inner surface of the top end-wall 29 of a sheet-metal, cylindrical, combined shield, distributor or barrier 31 extended downwardly around, and spaced away from, the corresponding portion of the filter-pack, the lower end of such member 31 flaring outwardly as shown at 32, such shield or guard extending downwardly well below the level of the opening of inlet 12 into chamber 13.

As portrayed in the drawings, this sheet-metal cover 31 at its top end extends inwardly at 29 forming a shoulder against the bottom surface of which the filter-pack bears, then upwardly at 33 providing a round opening through which the rod 18 extends, and then outwardly at 34, the three parts 29, 33 and 34 clamping firmly and fixedly between them the inner round portion of a ring-shaped leather or other comparable gasket 35 of right-angle cross-section as seen in Figure 1, the other circular section 36 of such right-angle being located between the top portion of the round wall of chamber 13 and the round outer surface of member 31, the lower edge of the part 36 of the gasket being bevelled upwardly inwardly at 37 for a purpose hereinafter indicated.

A cross-pin 38 extends through a hole through the central rod 18 and its protruding ends bear on the top face of the part 34 of the member 31, but before such pin is inserted in the relation shown, the metal end disc 25 and the intervening filter-discs of the pack 30 are pressed upwardly to establish suitable and adequate endwise pressure on the series of filter-discs to maintain the proper shallow width of gaps between their surfaces, and, while such pressure is thus exerted, the cross-pin is put in place and holds the parts thus pressed together face-to-face.

From what precedes, it will be obvious that, when the members are assembled as shown and described, those characterized 18, 30, 25, 28, 31, 35, 36 and 38 constitute a unit-assembly.

A sheet-metal shell or casing 39 with a rounded, lower end 41 and an outstanding, circular flange 42 surrounding the top, open mouth of the member 39 encloses a substantial portion of the filter-pack 30 and a part of the shield or distributor 31, the top face of such casing-flange 42 bearing against the under surface of a ring-gasket 43 of suitable material, dependent upon the nature of the material to be filtered, for instance a neoprene gasket if oil is to be filtered, the upper face of such gasket pressing against a flat, horizontal shoulder 44 of the main-body 11, another ring-gasket 45 being interposed between the under surface of the flange 42 and the top flat end of a hollow nut 46 having an angular head 47 by which it may be turned, the exterior screw-thread of the nut coacting with the internal screw-thread 14 of casting 11, whereby the nut in its normal position forces the three parts 43, 42 and 45 into pressure-tight relation with one another and with the nut and the main body.

When the parts are in their assembled positions indicated in Figure 1, the casing 39 compresses spring 28 and the latter pushes the filter-pack assembly up sufficiently to hold the gasket 35—36 in firm engagement with the upper end-wall of chamber 13.

To hold nut 46 from becoming loose or displaced, it may be held from turning by a wire 48 taking through the hole of an outstanding part 49 of the member 11 and through one of a series of holes 51 in the head 47 of the nut.

When the oil or other fluid to be filtered enters chamber 13 through inlet 12, to which any supply conduit may be easily connected, its pressure acting on the bevelled end of the round gasket 35—36 forces the depending part of the gasket outwardly circularly into firm and pressure-tight relation with the adjacent side-wall of the chamber, and the greater the pressure of the fluid, the greater the sealing action of the gasket, this sealing function being depended upon rather than that of the spring-pressed relation of the other companion portion of the gasket with the upper end-wall of the chamber.

The distributor 31 prevents the entering oil or other fluid from impinging directly on the filter-pack, causing such oil or fluid to be evenly distributed around and along the full length of the latter thereby securing uniformity of the filtering action throughout the whole surface of the pack, the liquid which passes between the discs entering the inner passage of the pack and flowing out of the discharge opening 16 which may be connected to any suitable conduit or pipe.

In assembling the leather-gasket 35—36 on the cup-shaped baffle 31, a coat of a solution of a phenolic resin, such as "Beckophene," is applied to the gasket or to the corresponding portion of the baffle or to both, and then polymerized by subjecting it to a known heat treatment in order to preclude any leaking between the two elements.

Also, prior to mounting the filter-paper pack 30 on its central, metal, retaining rod 18, the opposite ends of the paper-pack, the inner surface of that part 29 of the metal-baffle 31 on which the pack is to bear, and the top or upper surface of the metal-disc 25 are coated with a solution of a phenolic-resin or other plastic sealing compound, and, after the parts have been assembled, such coating is cured or polymerized to prevent leakage between the surfaces involved.

Those acquainted with this art will readily understand that, whereas certain details of structure have been presented herein, the invention as defined by the appended claims is not necessarily limited and restricted to such minor features and changes and modifications may be resorted to without departure from the heart and essence of the invention and without the loss or sacrifice of any of its substantial or material benefits and advantages.

We claim:

1. In an edge-filtration filter including a main-body with a cylindrical chamber having an inlet for the fluid to be filtered, an outlet for the filtered fluid, and a seat surrounding said outlet, a casing depending from said body and forming an enclosure therewith, means demountably securing said casing to said body, and an upright externally-cylindrical filter-element housed in said enclosure and operative between said inlet and outlet, said filter-element including a series of registered face-to-face contacting layers of an uneven-surface material surrounding an upright longitudinal passage through the filter-element, said material being impervious to the fluid to be filtered and to its one or more contaminants, an end-member closing the lower end of said filter-element passage, a rod in said passage fastened to said end-member and protruding upwardly beyond the top end of said passage, and a cross-member connected to said protruding part of said rod and overlying the corresponding end of the filter-element, the novel combination of a hollow, upright cylindrical baffle in said enclosure in front of said inlet and having an apertured top end-wall through which said rod extends, said baffle receiving a portion of said filter-element with annular spaces between said filter-element and baffle and between said baffle and the wall of said chamber and with the upper end of the filter-element bearing against the inner surface of said baffle end-wall, said cross-member bearing against the outer upper face of said baffle end-wall, and a gasket of angular cross-section fastened to said baffle and having a first portion bearing against said seat and a circular second portion between the cylindrical wall of said baffle and the cylindrical surface of said chamber, and means to press the unit structure of the filter-element, end-member, rod, cross-member, baffle and gasket upwardly against said seat, whereby demounting of said casing permits withdrawal of said unit-structure.

2. The novel combination set forth in claim 1 in which said means pressing said unit structure against said seat is a spring fastened to said filter-element end-member and engaging the inner surface of the lower portion of said casing.

RALPH L. SKINNER.
WALTER KASTEN.